(12) United States Patent
Terwilliger et al.

(10) Patent No.: US 12,078,104 B2
(45) Date of Patent: Sep. 3, 2024

(54) HYDROGEN STEAM INJECTED AND INTER-COOLED TURBINE ENGINE

(71) Applicant: RAYTHEON TECHNOLOGIES CORPORATION, Farmington, CT (US)

(72) Inventors: Neil J. Terwilliger, Cheshire, CT (US); Joseph B. Staubach, Colchester, CT (US); Charles E. Lents, Amston, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/317,545

(22) Filed: May 15, 2023

(65) Prior Publication Data

US 2023/0374941 A1   Nov. 23, 2023

Related U.S. Application Data

(60) Provisional application No. 63/343,595, filed on May 19, 2022.

(51) Int. Cl.
| | |
|---|---|
| *F02C 7/143* | (2006.01) |
| *F02C 3/20* | (2006.01) |
| *F02C 3/22* | (2006.01) |
| *F02C 3/30* | (2006.01) |
| *F02C 7/224* | (2006.01) |
| *F02C 7/22* | (2006.01) |
| *F02C 7/36* | (2006.01) |

(52) U.S. Cl.
CPC .............. *F02C 7/1435* (2013.01); *F02C 3/20* (2013.01); *F02C 3/22* (2013.01); *F02C 3/30* (2013.01); *F02C 3/305* (2013.01); *F02C 7/143* (2013.01); *F02C 7/224* (2013.01); *F02C 7/22* (2013.01); *F02C 7/36* (2013.01)

(58) Field of Classification Search
CPC ........ F02C 7/1435; F02C 7/143; F02C 7/224; F02C 7/22; F02C 3/20; F02C 3/22; F02C 3/30; F02C 3/305; F05D 2260/211; F05D 2260/212

See application file for complete search history.

(56) References Cited

U.S. PATENT DOCUMENTS

| | | | |
|---|---|---|---|
| 11,603,798 B1* | 3/2023 | Terwilliger | ............... F02C 7/18 |
| 11,635,022 B1* | 4/2023 | Terwilliger | ............... F02C 9/00 60/775 |

(Continued)

FOREIGN PATENT DOCUMENTS

FR    2674290 A1    9/1992

OTHER PUBLICATIONS

European Search Report for European Application No. 23174396.4 mailed Oct. 12, 2023.

(Continued)

*Primary Examiner* — William H Rodriguez
(74) *Attorney, Agent, or Firm* — Carlson, Gaskey & Olds, P.C.

(57) ABSTRACT

A propulsion system includes a core engine generating a high energy gas flow, a condenser configured to extract water from the high energy gas flow and an evaporator transforming the extracted water into a steam flow. The steam flow is injected into a core flow path of the core engine increase mass flow.

20 Claims, 5 Drawing Sheets

(56) References Cited

U.S. PATENT DOCUMENTS

| | | | |
|---|---|---|---|
| 11,753,993 B1* | 9/2023 | Terwilliger | F02C 3/22 |
| | | | 60/266 |
| 11,808,209 B1* | 11/2023 | Sobanski | F02C 6/18 |
| 11,920,526 B1* | 3/2024 | Terwilliger | F02C 7/185 |
| 11,927,132 B1* | 3/2024 | Terwilliger | F02C 6/18 |
| 2014/0157752 A1* | 6/2014 | Hasel | F02C 3/107 |
| | | | 60/226.1 |
| 2021/0207500 A1 | 7/2021 | Klingels et al. | |
| 2021/0348561 A1* | 11/2021 | Cocks | F02C 7/12 |
| 2023/0258106 A1* | 8/2023 | Terwilliger | F02C 3/30 |
| | | | 60/775 |
| 2023/0258130 A1* | 8/2023 | Terwilliger | F02C 7/224 |
| | | | 60/266 |
| 2023/0366348 A1* | 11/2023 | Alahyari | F02C 3/22 |
| 2023/0374911 A1* | 11/2023 | Terwilliger | F02C 3/22 |
| 2023/0374938 A1* | 11/2023 | Staubach | F02C 3/22 |
| 2024/0011436 A1* | 1/2024 | Terwilliger | F02K 5/00 |
| 2024/0026816 A1* | 1/2024 | Terwilliger | F02C 3/30 |
| 2024/0052792 A1* | 2/2024 | Terwilliger | F02C 3/06 |
| 2024/0102416 A1* | 3/2024 | Lei Ma | F01D 25/32 |

OTHER PUBLICATIONS

Polyzakis, et al., "Optimum gas turbine cycle for combined cycle power plant," Energy Conversion & Management, Feb. 22, 2008, pp. 551-563, vol. 49, No. 4, Elsevier Science Publishers, Oxford, GB.

* cited by examiner

HYDROGEN STEAM INJECTED AND INTER-COOLED TURBINE ENGINE

CROSS-REFERENCE TO RELATED APPLICATION

The present disclosure claims priority to U.S. Provisional Application No. 63/343,595 filed May 19, 2022.

TECHNICAL FIELD

The present disclosure relates generally to a hydrogen powered aircraft propulsion system and, more particularly to hydrogen steam injected and intercooled turbine engine.

BACKGROUND

Reduction and/or elimination of carbon emissions generated by aircraft operation is a stated goal of aircraft manufacturers and airline operators. Gas turbine engines compress incoming core airflow, mix the compressed airflow with fuel that is ignited in a combustor to generate a high energy exhaust gas flow. Some energy in the high energy exhaust flow is recovered as it is expanded through a turbine section. Even with the use of alternate fuels, a large amount of energy in the form of heat is simply exhausted from the turbine section to atmosphere. The lost heat reduces the overall efficiency of the engine Turbine engine manufacturers continue to seek further improvements to engine performance including improvements to reduce environmental impact while improving propulsive efficiencies.

SUMMARY

A propulsion system for an aircraft according to one example disclosed embodiment includes, among other possible things, a core engine including a core flow path where air is compressed in a compressor section, communicated to a combustor section, mixed with a hydrogen based fuel and ignited to generate a high energy gas flow that is expanded through a turbine section, a hydrogen fuel system configured to supply hydrogen fuel to the combustor through a fuel flow path, a condenser arranged along the core flow path and configured to extract water from the high energy gas flow, an evaporator arranged along the core flow path and configured to receive a portion of the water extracted by the condenser to generate a steam flow, wherein the steam flow is injected into the core flow path upstream of the turbine section, and an intercooling system configured to inject water into the compressor section to reduce a temperature of a core airflow within the core flow path, wherein an overall pressure ratio of the compressor section is split between a first pressure ratio before injection of water and a second pressure ration after injection of water and a split pressure ratio of the first pressure ratio relative to the second pressure ratio is between 2 and 15.

In another embodiment of the foregoing propulsion system, the split pressure ratio is between 5 and 10.

In another embodiment of any of the foregoing propulsion systems, the split pressure ratio is between 8 and 12.

In another embodiment of any of the foregoing propulsion systems, the first pressure ratio is between 10 and 30.

In another embodiment of any of the foregoing propulsion systems, the second pressure ratio is between 2 and 5.

In another embodiment of any of the foregoing propulsion systems, the compressor section includes a first compressor upstream from a second compressor and the intercooling system is configured to inject water between an outlet of the first compressor and an inlet of the second compressor.

In another embodiment of any of the foregoing propulsion systems, an intercooler evaporator is configured to transform water to steam prior to injection into the compressor section.

In another embodiment of any of the foregoing propulsion systems, an intercooler evaporator is configured to receive the core flow exhausted from the first compressor section, mix the core airflow with evaporated water and communicated the mixed core flow to an inlet of the second compressor.

In another embodiment of any of the foregoing propulsion systems, the intercooling system is configured to communicate a water flow into thermal communication with a static structure of the compressor section.

In another embodiment of any of the foregoing propulsion systems, the intercooling system is further configured to evaporate the water flow after cooling the static structure and inject the evaporated water into the compressor section.

In another embodiment of any of the foregoing propulsion systems, the intercooling system is configured to inject evaporated water at multiple axial locations within the compressor section.

In another embodiment of any of the foregoing propulsion systems, a water storage tank and the condenser communicates water to the water storage tank and a first pump is configured to move water from the storage tank for the intercooling system.

In another embodiment of any of the foregoing propulsion systems, the turbine section includes a low pressure turbine configured to drive a fan through a low shaft.

In another embodiment of any of the foregoing propulsion systems, a gearbox coupled to the low shaft for driving the fan at a speed lower than the low pressure turbine.

A propulsion system for an aircraft according to another disclosed embodiment includes, among other possible things, a core engine including a core flow path where air is compressed in a compressor section, communicated to a combustor section, mixed with a hydrogen based fuel and ignited to generate a high energy gas flow that is expanded through a turbine section. The compressor section including a low pressure compressor upstream of a high pressure compressor. The system further including a hydrogen fuel system configured to supply hydrogen fuel to the combustor through a fuel flow path, a condenser arranged along the core flow path and configured to extract water from the high energy gas flow, an evaporator arranged along the core flow path and configured to receive a portion of the water extracted by the condenser to generate a steam flow, wherein the steam flow is injected into the core flow path upstream of the turbine section, and an intercooling system configured to inject water into the compressor section to reduce a temperature of a core airflow within the core flow path, wherein an overall pressure ratio of the compressor section is split between a first pressure ratio before injection of steam and a second pressure ratio after injection of steam and a split pressure ratio of the first pressure ratio relative to the second pressure ratio is between 2 and 15.

In another embodiment of the foregoing propulsion system, the split pressure ratio is between 5 and 10.

In another embodiment of any of the foregoing propulsion systems, the split pressure ratio is between 8 and 12.

In another embodiment of any of the foregoing propulsion systems, intercooler evaporator is configured to transform water to steam prior to injection into the compressor section.

In another embodiment of any of the foregoing propulsion systems, an intercooler evaporator is configured to receive the core flow exhausted from the low pressure compressor section, mix the core airflow with evaporated water and communicate the mixed core flow to an inlet of the high pressure compressor.

In another embodiment of any of the foregoing propulsion systems, the intercooling system is further configured to evaporate the water flow after cooling a static structure of the compressor section and inject the evaporated water into the compressor section.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
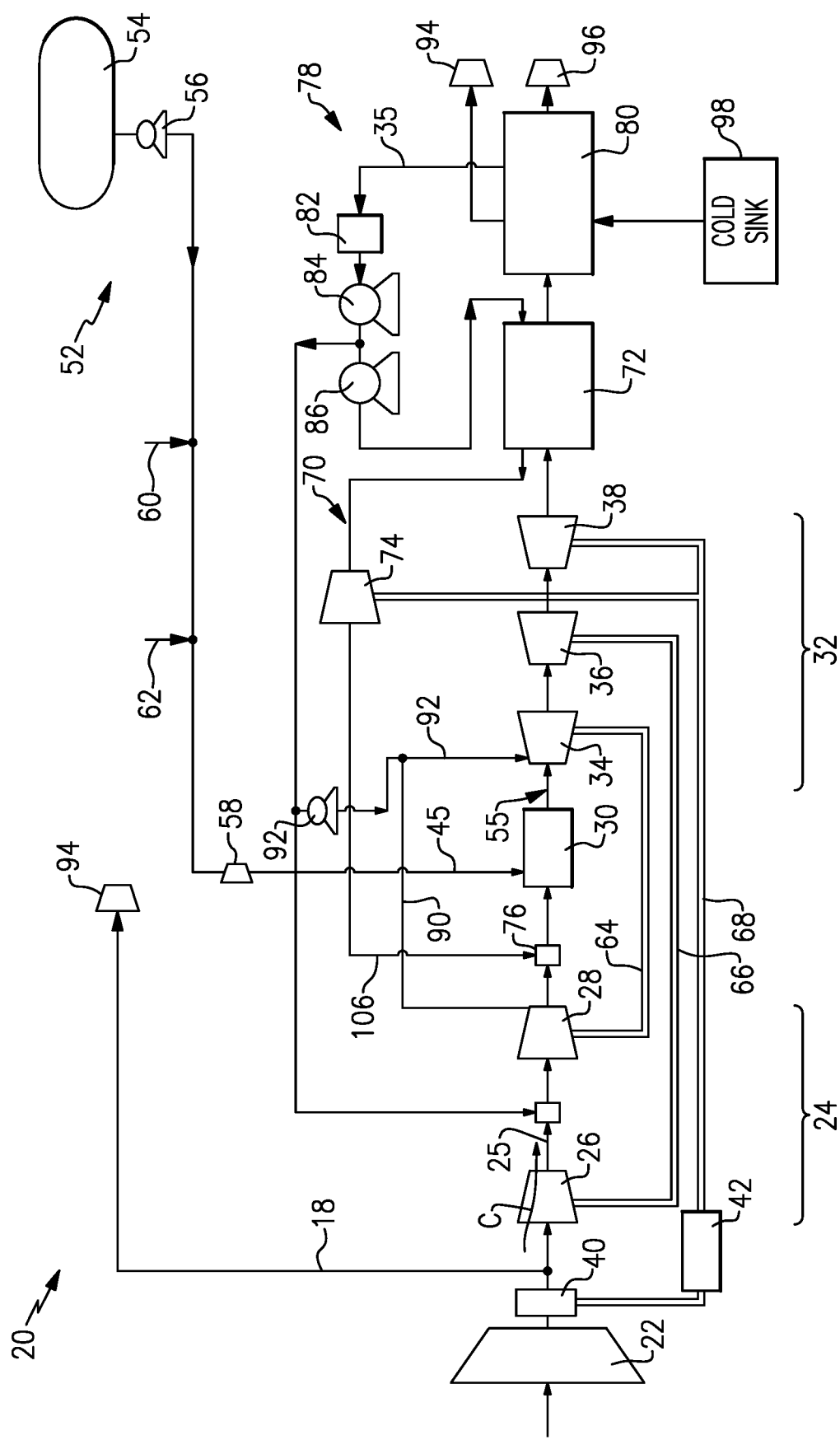
FIG. 1 is a schematic view of an example propulsion system embodiment.

FIG. 1 schematically illustrates an example hydrogen steam injected intercooled turbine engine that is generally indicated at 20. The engine 20 includes core engine with a core airflow path C through a fan 22, a compressor section 24, a combustor 30 and a turbine section 32. The fan 22 drives inlet air as a core flow 25 into the compressor section 24. In the compressor section 24, the core flow 25 is compressed and communicated to a combustor 30. In the combustor 30, the core flow 25 is mixed with a hydrogen ($H_2$) fuel flow 45 and ignited to generate a high energy gas flow 55 that expands through the turbine section 32 where energy is extracted and utilized to drive the fan 22 and the compressor section 24. A bypass flow 18 may flow through the fan 22, bypass the remaining components of the engine 20, and exit through a fan nozzle 94. The high energy gas flow 55 is exhausted from the turbine section 32 and communicated to a steam generation system 70 and a water recovery system 78 before being exhausted through a core nozzle 96.

The engine 20 is configured to burn hydrogen provide by a fuel system 52. The fuel system 52 includes a liquid hydrogen ($LH_2$) tank 54 in communication with at least one pump 56. The pump 56 drives a fuel flow 45 to the combustor 30. $LH_2$ provides a thermal heat sink that can be utilized to cool various heat loads within the aircraft indicated at 60 and in the engine as indicated at 62. The heat loads may include, for example and without limitation, super conducting electrics, a working fluid of an environmental control system of the aircraft, an air conditioning heat exchanger, and engine working fluid heat exchangers. Heat accepted into the hydrogen fuel flow increase the overall fuel temperature prior to injection into the combustor 30.

A hydrogen expansion turbine 58 may be provided to reduce the pressure of the $LH_2$ fuel flow through expansion prior to communication to the combustor 30. Expansion in the expansion turbine 58 provides for the temperatures and pressures of the fuel flow to enter the combustor 30 as a gas and not a liquid.

The steam injection system 70 uses the exhaust heat to generate a steam flow 106 by evaporating high pressure water through an evaporator 72. The generated steam may then be injected into compressed core airflow at a location 76 for communication into the combustor 30 to improve performance by increasing turbine mass flow and power output without additional work required by the compressor section. In one example embodiment the location 76 is upstream of the combustor 30. Steam flow from the evaporator 72 may drive a steam turbine 74 to provide an additional work output prior to injection into the combustor 30.

The water recovery system 78 draws water, schematically indicated at 35, from the high energy gas flow 55 and communicates the recovered water to water storage tank 82. The water storage tank 82 operates as an accumulator to provide sufficient water for operation during various engine operating conditions. A condenser/water separator 80 is provided downstream of the turbine section 32 and the evaporator 72. The condenser/separator 80 is in communication with a cold sink, schematically indicated at 98 for the condenser/separator 80 may be, for example, ram or fan air depending on the application and/or engine configuration.

The engine 20 has an increased power output from the injected steam 106 due to an increasing mass flow through the turbine section 32 without a corresponding increase in work from the compressor section 24. An example engine operation cycle may include up to (or more than) 35% steam-air-ratios (SAR) and may be assisted by a multiple fold (e.g., 2×, 3×, etc.) increase in moisture from burning $H_2$ as the fuel.

The water recovery system 78 includes the water storage tank 82 that receives water from the condenser/water separator 80 and provides for the accumulation of a volume of water required for production of sufficient amounts of steam. Water recovered from the exhaust gas flow is driven by a low pressure pump 84 and a high pressure pump 86 to the evaporator 72.

A water intercooling flow 88 may be communicated to the compressor section 24 to reduce a temperature of the core airflow 25 and increase mass flow. Reduced temperatures and increased mass flow provided by injection of water decreases the work required by the compressor. Water may also be used as a cooling flow 92 to cool cooling air flow 90 communicated from the compressor section 24 to the turbine section 32.

The example compressor section 24 includes a low pressure compressor (LPC) 26 and a high pressure compressor (HPC) 28. The turbine section 32 includes a high pressure turbine (HPT) 34, an intermediate pressure turbine (IPT) 36, and a low pressure turbine (LPT) 38. The turbines 34, 36 and 38 are coupled to a corresponding compressor section. In this disclosed example, the high pressure turbine is coupled by a high shaft 64 to drive the high pressure compressor 28. An intermediate shaft 66 couples the intermediate turbine 36 to the low pressure compressor 26.

A low shaft 68 is coupled to the low pressure turbine 38 and a gearbox 40 to drive the fan 22. The low shaft 68 may further be coupled to an electric machine 42 that is configured to impart and/or extract power into the low shaft 68. The example gearbox 40 is an epicyclical gear train, such as a planetary gear system, star gear system or other known gear system, with a gear reduction ratio of greater than about 2.3.

Although the example engine 20 is described and shown by way of example as a three spool engine, other engine configurations, such as two-spool may also benefit from this disclosure and are within the contemplation and scope of this disclosure.

Figure 2:
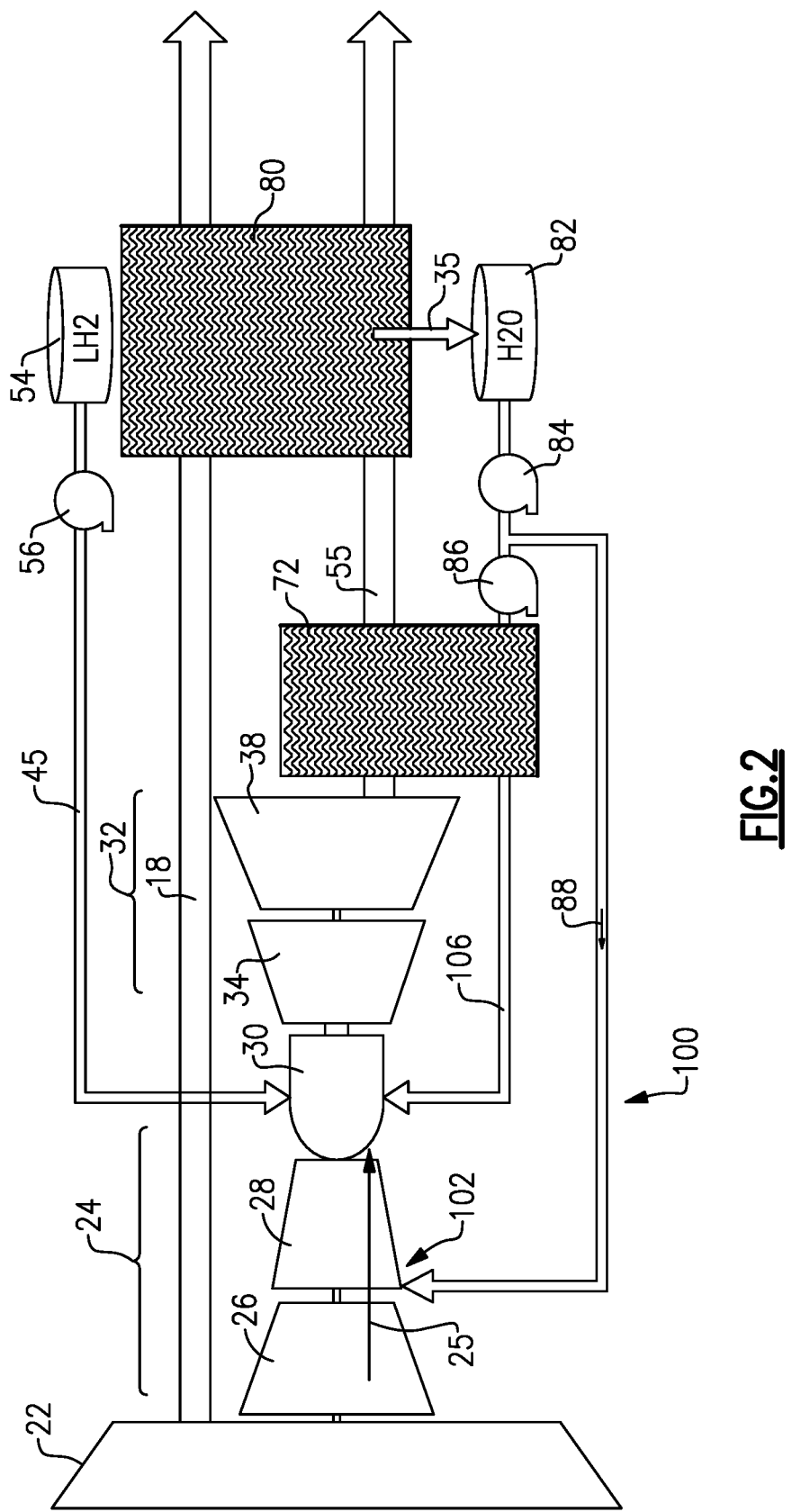
FIG. 2 is a simplified schematic view of the example propulsion system embodiment.

Referring to FIG. 2, with continued reference to FIG. 1, the example engine 20 is shown in a simplified schematic view and includes an intercooling system 100. The intercooling system 100 injections and mixes water to cool and increase the mass of the core airflow 25 through the compressor section 24. Heating and boiling of water injected into the core airflow 25 lowers the temperature of the core airflow 25 and increases the mass flow through subsequent portions of the compressor section 24.

The intercooling system 100 generates a different pressure ratio at locations forward of injection and downstream of injection. In this disclosed example, water flow 88 is communicated to a location 102 between the LPC 26 and the HPC 28. The location of injection is downstream of an outlet of the LPC 26 and upstream of the HPC 28. Accordingly, in this example embodiment a first portion of the compressor section 24 upstream of the water injection is the LPC 26 and a second portion of the compressor section downstream of the water injection is the HPC 28. It should be appreciated that other injection locations could be utilized for engine configuration with additional compressor sections. Moreover, water injection may be provided at a location within one of the different compressor sections.

In the example shown in FIG. 2, water is injected into the core flow 25 after the LPC 26. The temperature of the core flow 25, after the LPC 26, is sufficient to heat and boil the water flow 88 such that the water flow 88 is substantially transformed into steam. The transformation into steam and mixing with the core flow 25 lowers the overall temperature rather than cooling the core flow 25. The lower temperature and increased mass flow improve compressor work output. The increased work output can be quantified in a pressure ratio through each compressor section and a relationship of those pressure ratios.

In one disclosed embodiment, a first pressure ratio is provided between an inlet of the compressor section and the injection location. A second pressure ratio is provided from the injection location to the outlet of the compressor section just prior to entering the combustor 30.

In this example embodiment, the first pressure ratio is that pressure ratio provided in the LPC 26 and the second pressure ratio is that pressure ratio provided by the HPC 28. In one disclose example embodiment, the first pressure ratio is between 10 and 20 and the second pressure ratio is between 2 and 5. In another disclosed embodiment, the first pressure ration is between 12 and 18 and the second pressure ratio is between 3 and 5.

A split pressure ratio provides a relationship between the first pressure ratio and the second pressure ratio. Accordingly, the split pressure ratio is the first pressure ratio over the second pressure ratio. In one disclosed embodiment, the split pressure ratio is between 2 and 15. In another disclosed example embodiment, the split pressure ratio is between 5 and 10. In yet another example embodiment, the split pressure ratio is between 8 and 12.

Figure 3:
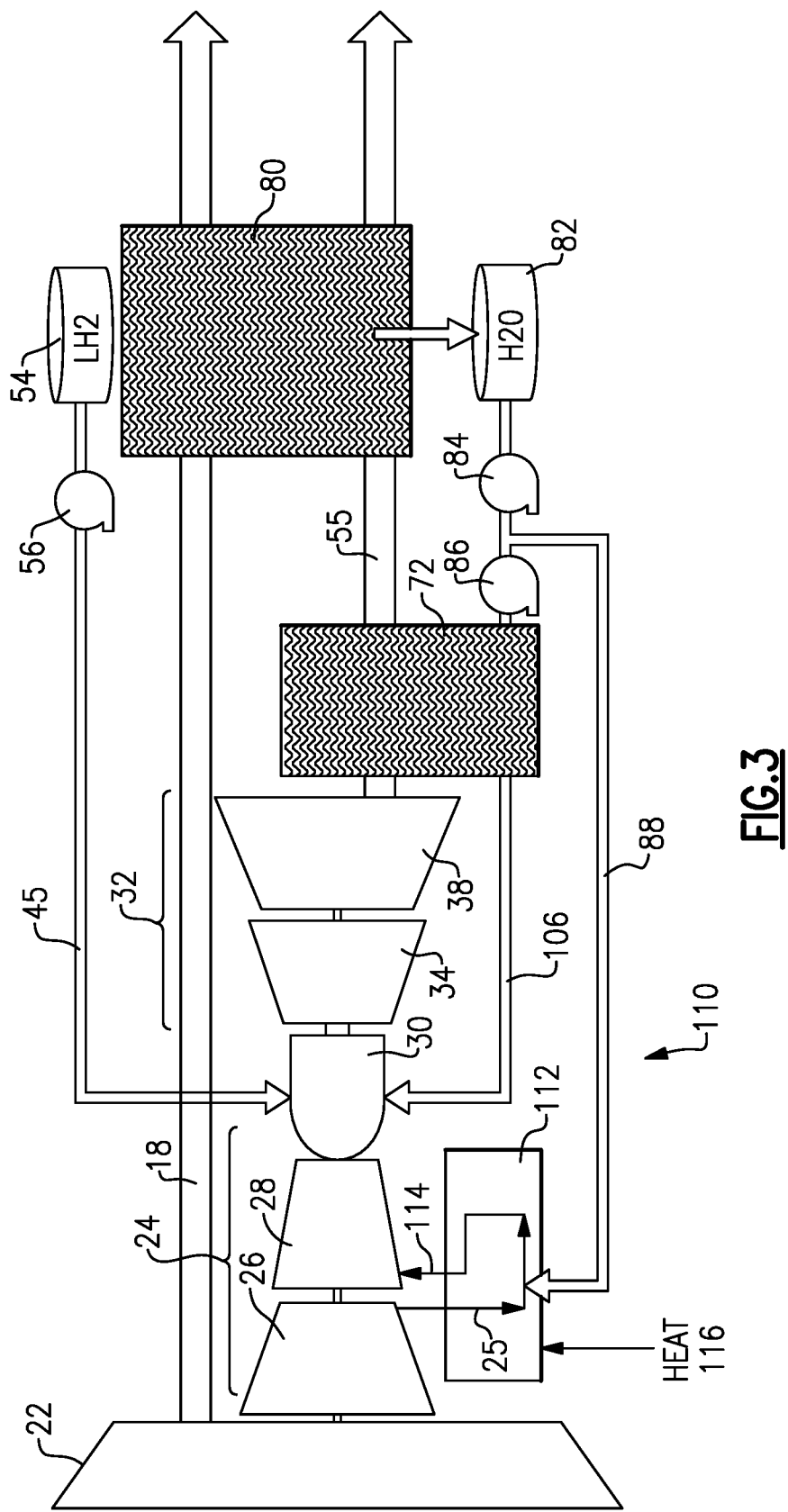
FIG. 3 is a schematic view of another example propulsion system embodiment.

Referring to FIG. 3, another intercooling system 110 for the propulsion system 20 is schematically shown and includes a premixing evaporator 112 that injects a premixed flow 114 in the HPC 28. The premixing evaporator 112 provides for transformation of water into steam prior to entering the combustor section. In this disclosed example, the core airflow exhausted from the LPC 26 is mixed with water flow 88. Heat from the core airflow 25 causes any water to be transformed into steam prior to communication to the HPC 28. Heat, schematically indicated at 116, may be input into the premixing evaporator 112 to assure a complete transformation of water to steam. The heat 116 can be communicated from other heat producing engine systems either by direct location of the premixing evaporator 112 and/or by communication of a hot flow.

As appreciated, although the premixing evaporator 112 is shown schematically in a location proximate the compressor section 24, the premixing evaporator 112 may be located at other locations based on application specific configurations. Moreover, the premixing evaporator 112 may be configured in any manner that provides mixing of the core airflow 25, transformation of any water from the water flow 88 into steam and communication back to the compressor section 28.

Figure 4:
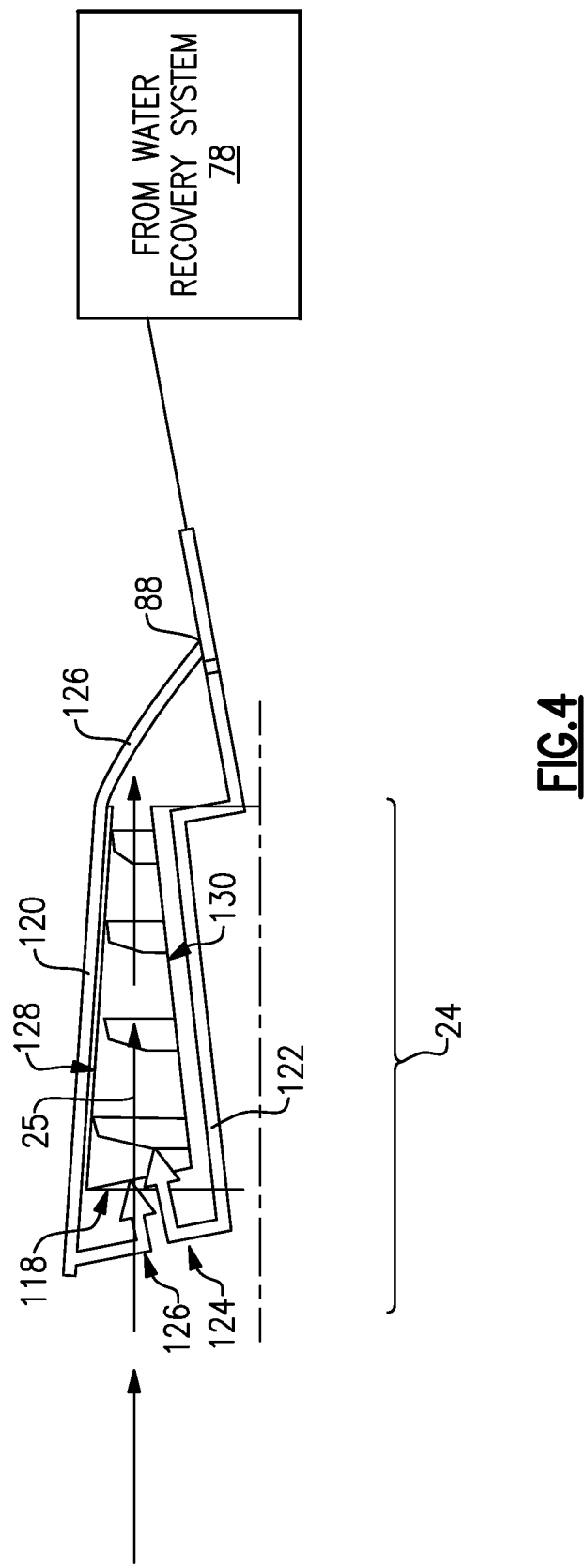
FIG. 4 is a schematic view of a portion of static structure of a compressor section.

Referring to FIG. 4 with continued reference to FIGS. 2 and 3, a portion of a static structure 118 is schematically shown and is cooled with by the flow of water 88 from the water recovery system 78. Water may be routed along an outer periphery 128 as indicated at 120 or along an inner periphery 130 as indicated at 122. The cooling water flow along the inner or outer peripheries 130, 128 are configured to be in thermal communication with the corresponding static structures to accept heat into the water/steam flow 88. The acceptance of heat can provide for further transformation of any liquid into steam and further heat any existing steam.

The water flow in thermal communication with the static structure 118 is then injected into the core airflow 25 as indicated at 124, 126. The cooled static structure 118 can further reduce the temperature of the compressor section 24 while also heating the water flow 88 to eliminate any residual liquid. The example routing of the cooling water flows 120, 122 are schematically shown and maybe located at different locations within the compressor section.

Figure 5:
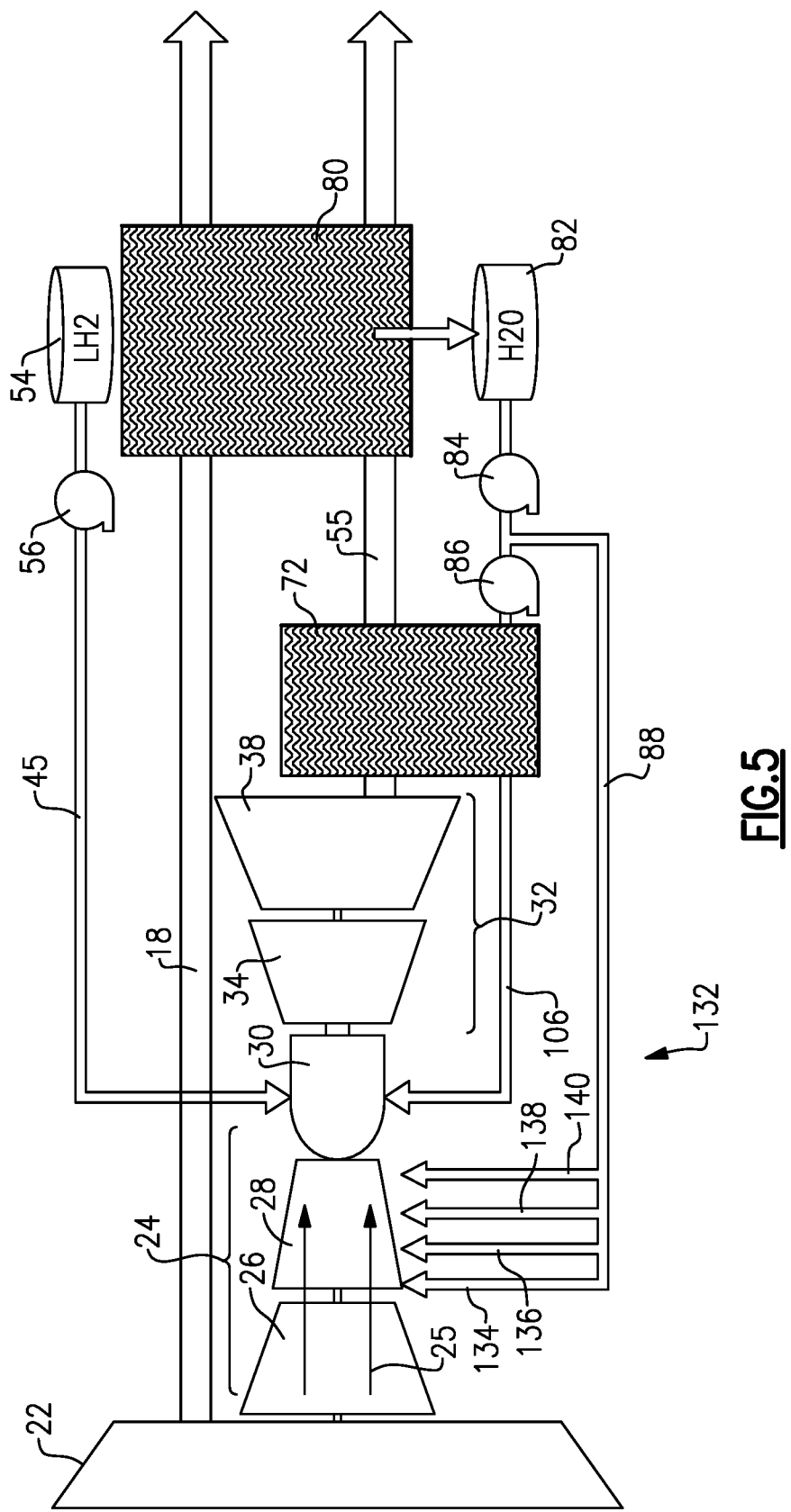
FIG. 5 is another schematic view of another example propulsion system embodiment.

Referring to FIG. 5, another example intercooling system 132 is schematically shown and includes a plurality of water injection locations 134, 136, 138 and 140. The multiple sites for water injection provide for keeping the structure of the compressor section 24 within material temperature capabilities. Introducing water/steam flow 88 later in the compressor sections 24 reduces the heat that is input into the core flow stream 25. The later introduction of the water/steam flow 88 reduces the magnitude of any temperature gradients in the compressor structure that may be caused by the increased mass flow.

In this disclosed embodiments, the injections locations 134, 136, 138 and 140 are axially spaced for injection into the HPC 28. The locations are shown schematically evenly spaced axially, however, the spacing maybe provided in a non-uniform matter to tailor water/steam injection into specific compressor stages. Moreover, although all of the injection locations 134, 136, 138 and 140 are schematically shown in the HPC 28, various locations throughout the LPC 26 and the HPC 28 could be utilized and are within the contemplation and scope of this disclosure.

Disclosed examples of the engine 20 include intercooling systems that provide increased propulsive efficiencies with a unique pressure ratio split using water/steam injection into the compressor section with water recovered from the engine exhaust gas stream.

Although an example engine configuration is described by way of example, it will be appreciated that other engine configurations may include additional structures and features and are within the contemplation and scope of this disclosure.

Accordingly, the disclosed assemblies provide for the advantageous use of ammonia fuel to improve engine efficiency and reduce carbon emission. The disclosed systems use the advantageous thermal capacity of ammonia to maximize the recapture of heat and cool other working flows of the engine.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A propulsion system for an aircraft comprising:
   a core engine including a core flow path where air is compressed in a compressor section, communicated to a combustor section, mixed with a hydrogen based fuel and ignited to generate a high energy gas flow that is expanded through a turbine section;
   a hydrogen fuel system configured to supply hydrogen fuel to the combustor through a fuel flow path;
   a condenser arranged along the core flow path and configured to extract water from the high energy gas flow;
   an evaporator arranged along the core flow path and configured to receive a portion of the water extracted by the condenser to generate a steam flow, wherein the steam flow is injected into the core flow path upstream of the turbine section; and
   an intercooling system configured to inject water into the compressor section to reduce a temperature of a core airflow within the core flow path, wherein an overall pressure ratio of the compressor section is split between a first pressure ratio before injection of water and a second pressure ration after injection of water and a split pressure ratio of the first pressure ratio relative to the second pressure ratio is between 2 and 15.

2. The propulsion system as recited in claim 1, wherein the split pressure ratio is between 5 and 10.

3. The propulsion system as recited in claim 1, wherein the split pressure ratio is between 8 and 12.

4. The propulsion system as recited in claim 1, wherein the first pressure ratio is between 10 and 30.

5. The propulsion system as recited in claim 4, wherein the second pressure ratio is between 2 and 5.

6. The propulsion system as recited in claim 1, wherein the compressor section includes a first compressor upstream from a second compressor and the intercooling system is configured to inject water between an outlet of the first compressor and an inlet of the second compressor.

7. The propulsion system as recited in claim 6, including an intercooler evaporator configured to transform water to steam prior to injection into the compressor section.

8. The propulsion system as recited in claim 6, including an intercooler evaporator configured to received the core flow exhausted from the first compressor section, mix the core airflow with evaporated water and communicated the mixed core flow to an inlet of the second compressor.

9. The propulsion system as recited in claim 1, wherein the intercooling system is configured to communicate a water flow into thermal communication with a static structure of the compressor section.

10. The propulsion system as recited in claim 9, wherein the intercooling system is further configured to evaporate the water flow after cooling the static structure and inject the evaporated water into the compressor section.

11. The propulsion system as recited in claim 1, wherein the intercooling system is configured to inject evaporated water at multiple axial locations within the compressor section.

12. The propulsion system as recited in claim 1, including a water storage tank and the condenser communicates water to the water storage tank and a first pump is configured to move water from the storage tank for the intercooling system.

13. The propulsion system as recited in claim 1, wherein the turbine section includes a low pressure turbine configured to drive a fan through a low shaft.

14. The propulsion system as recited in claim 13, including a gearbox coupled to the low shaft for driving the fan at a speed lower than the low pressure turbine.

15. A propulsion system for an aircraft comprising:
   a core engine including a core flow path where air is compressed in a compressor section, communicated to a combustor section, mixed with a hydrogen based fuel and ignited to generate a high energy gas flow that is expanded through a turbine section, wherein the compressor section includes a low pressure compressor upstream of a high pressure compressor;
   a hydrogen fuel system configured to supply hydrogen fuel to the combustor through a fuel flow path;
   a condenser arranged along the core flow path and configured to extract water from the high energy gas flow;
   an evaporator arranged along the core flow path and configured to receive a portion of the water extracted by the condenser to generate a steam flow, wherein the steam flow is injected into the core flow path upstream of the turbine section; and
   an intercooling system configured to inject water into the compressor section to reduce a temperature of a core airflow within the core flow path, wherein an overall pressure ratio of the compressor section is split between a first pressure ratio before injection of steam and a second pressure ratio after injection of steam and a split pressure ratio of the first pressure ratio relative to the second pressure ratio is between 2 and 15.

16. The propulsion system as recited in claim 13, wherein the split pressure ratio is between 5 and 10.

17. The propulsion system as recited in claim 16, wherein the split pressure ratio is between 8 and 12.

18. The propulsion system as recited in claim 15, including an intercooler evaporator configured to transform water to steam prior to injection into the compressor section.

19. The propulsion system as recited in claim 15, including an intercooler evaporator configured to receive the core flow exhausted from the low pressure compressor section, mix the core airflow with evaporated water and communicate the mixed core flow to an inlet of the high pressure compressor.

20. The propulsion system as recited in claim 19, wherein the intercooling system is further configured to evaporate the water flow after cooling a static structure of the compressor section and inject the evaporated water into the compressor section.

* * * * *